G. A. & S. E. SIDERS.
SPRING WHEEL.
APPLICATION FILED DEC. 28, 1910.

1,008,375.

Patented Nov. 14, 1911.

2 SHEETS—SHEET 1.

Witnesses
Fenton S. Belt
[signature]

Inventors
George A. Siders and
Samuel E. Siders
By Victor J. Evans
Attorney

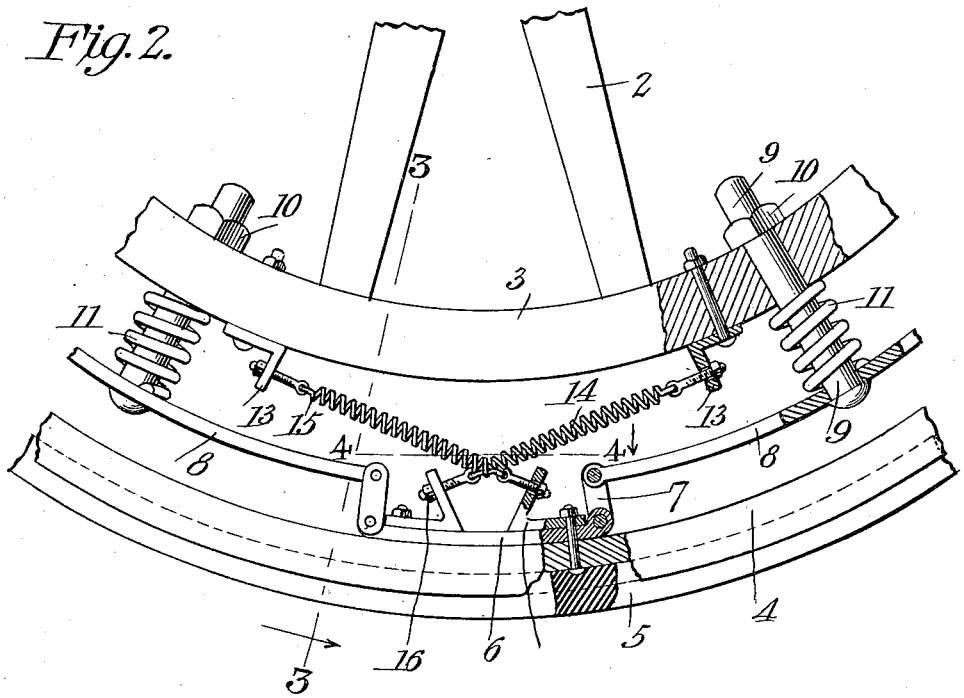
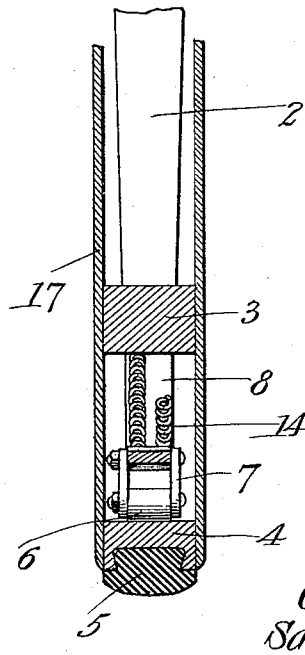

UNITED STATES PATENT OFFICE.

GEORGE A. SIDERS AND SAMUEL E. SIDERS, OF DELPHOS, KANSAS.

SPRING-WHEEL.

1,008,375.  Specification of Letters Patent.  Patented Nov. 14, 1911.

Application filed December 28, 1910. Serial No. 599,661.

*To all whom it may concern:*

Be it known that we, GEORGE A. SIDERS and SAMUEL E. SIDERS, citizens of the United States, residing at Delphos, in the county of Ottawa and State of Kansas, have invented new and useful Improvements in Spring-Wheels, of which the following is a specification.

This invention relates to spring wheels and the object of the invention is the provision of a simple, cheaply constructed and efficient wheel of this character which will take the place of the present type of pneumatic tire wheels.

Figure 1:
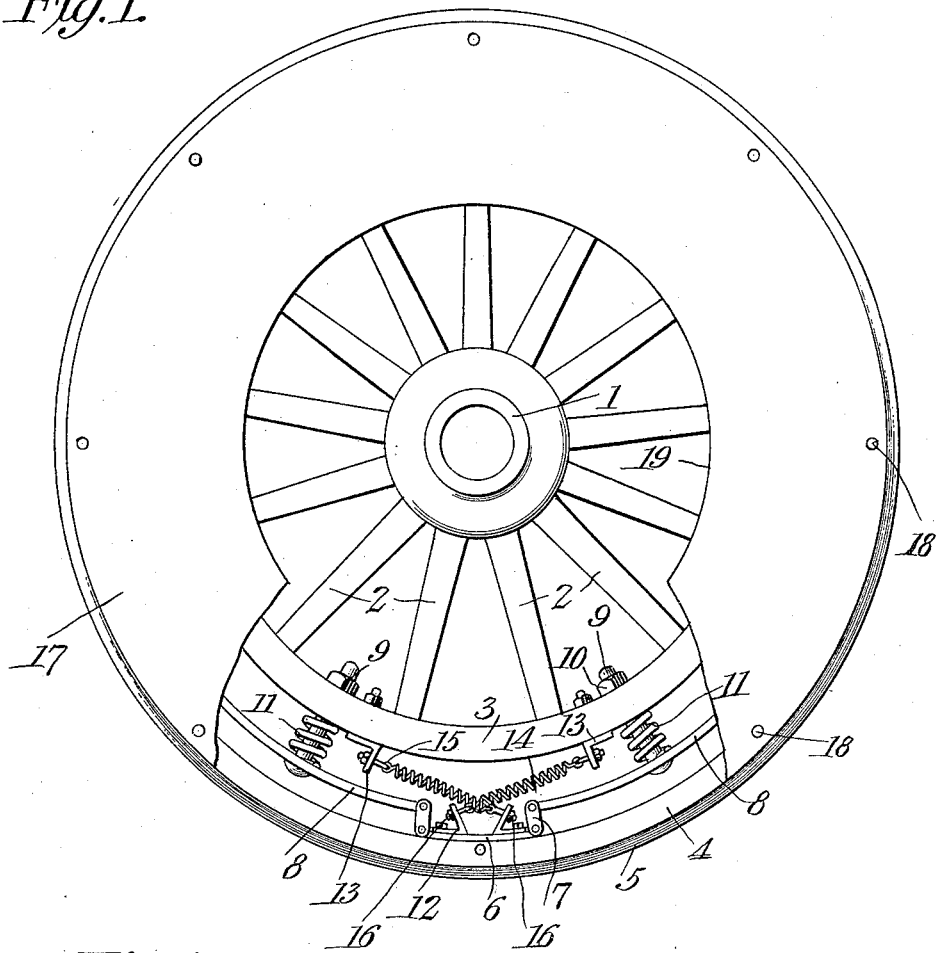
Figure 4:
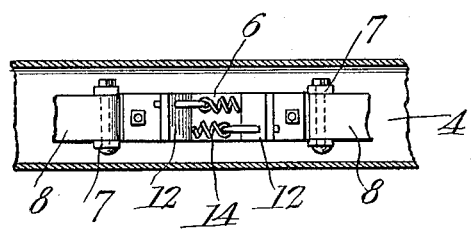

Further objects of the invention will appear as the following specific description is read in connection with the accompanying drawing which forms a part of this application, and in which:

Figure 1 is a side elevation with a portion of the casing broken away. Fig. 2 is a similar view of a portion of the wheel on an enlarged scale. Fig. 3 is a detail sectional view on the line 3—3 of Fig. 2. Fig. 4 is a section taken on the line 4—4 of Fig. 2.

Referring more particularly to the drawing 1 represents the hub which has a plurality of spokes 2 radiating therefrom and connected at their outer ends to the wheel rims 3. Spaced away from the rim 3 is the tire felly 4 upon which a rubber or other cushion tire 5 is secured. Secured around the inside of the felly at intervals are suitable mounting brackets 6 having pivoting ears 7 pivotally connected thereto at each end, and connected between the adjacent ears are leaf springs 8 which in normal position conform to the curvature of the felly 4. These springs are connected to the wheel rims by bolts 9 which have adjusting nuts 10 mounted thereon and surrounding the bolts 9 and bridged between the springs 8 and rim 3 are spiral springs 11 which assist the action of the springs 8. These spiral springs may have their tension adjusted to any desired degree by the nuts 10.

Secured upon the top of the plates 6 between the pivoting ears 7 are inwardly extending bracket arms 12 and secured to the felly between certain of the bolts 9 are outwardly extending bracket arms 13 which are connected to the bracket arms 12 by means of the spiral springs 14 and 15, each of which are provided at their ends with eye bolts to pass through the brackets and have the adjusting nuts 16. These springs take up any circumferential displacement of the felly relative to the rim.

In order to keep the parts free from dust, shields 17 are secured to the felly 4 by bolts 18 and have their center provided with an aperture whose walls just overlap the outer edge of the hub. These shields also prevent any lateral displacement of the felly and tire and at the same time permit free movement of the axle.

Having thus described the invention, what is claimed is—

A spring wheel comprising a hub and a rim, a felly separated from the rim, leaf springs carried by the felly, bolts connecting the leaf springs and rim, springs surrounding said bolts between the leaf springs and the rim, and a pair of springs arranged diagonally across the space between the rim and felly and in opposition to each other, said springs connecting the rim and felly, together with a dust shield carried by the felly and free of the rim.

In testimony whereof we affix our signatures in presence of two witnesses.

GEORGE A. SIDERS.
SAMUEL E. SIDERS.

Witnesses:
M. E. ABLARD,
J. R. TRUEX.

Copies of this patent may be obtained for five cents each, by addressing the "Commissioner of Patents, Washington, D. C."